(12) United States Patent
Onabajo et al.

(10) Patent No.: US 10,074,580 B2
(45) Date of Patent: Sep. 11, 2018

(54) METHOD TO USE ON-CHIP TEMPERATURE SENSORS FOR DETECTION OF TROJAN CIRCUITS

(71) Applicant: Northeastern University, Boston, MA (US)

(72) Inventors: Marvin Onabajo, Jamaica Plain, MA (US); Yong-Bin Kim, Franklin, MA (US)

(73) Assignee: Northeastern University, Boston, MA (US)

( * ) Notice: Subject to any disclaimer, the term of this patent is extended or adjusted under 35 U.S.C. 154(b) by 194 days.

(21) Appl. No.: 15/173,889

(22) Filed: Jun. 6, 2016

(65) Prior Publication Data
US 2016/0371485 A1    Dec. 22, 2016

Related U.S. Application Data (60) Provisional application No. 62/180,780, filed on Jun. 17, 2015.

(51) Int. Cl.
| | |
|---|---|
| *G06F 12/14* | (2006.01) |
| *G06F 12/16* | (2006.01) |
| *H01L 23/00* | (2006.01) |
| *G06F 21/55* | (2013.01) |

(52) U.S. Cl.
CPC ............ *H01L 23/00* (2013.01); *G06F 21/552* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,701,244 B2* | 4/2010 | Bartley | G06F 21/75 326/38 |
| 2012/0278893 A1* | 11/2012 | Jyothi | G06F 21/566 726/24 |
| 2013/0019324 A1* | 1/2013 | Tehranipoor | H03K 3/0315 726/34 |

OTHER PUBLICATIONS

D. Agrawal, et al., "Trojan Detection using IC Fingerprinting", Proc. IEEE Symposium on Security and Privacy, May 2007, pp. 296-310.

J. Altet, et al., "Thermal Coupling in Integrated Circuits: Application to Thermal Testing", IEEE Journal of Solid-State Circuits, Jan. 2001, vol. 36, No. 1, pp. 81-91.

J. Altet, et al, "Structural RFIC Device Testing through Built-In Thermal Monitoring", IEEE Communications Magazine, Sep. 2003, vol. 41, No. 9, pp. 98-104.

M. Banga, et al., "A Region Based Approach for the Identification of Hardware Trojans", Proc. IEEE Intl. Symp. Hardware-Oriented Security and Trust (HOST), Jun. 2008, pp. 40-47.

(Continued)

*Primary Examiner* — Fatoumata Traore
(74) *Attorney, Agent, or Firm* — Posternak Blankstein & Lund LLP (57) ABSTRACT

A method for detecting a malicious circuit on an integrated circuit chip is provided, in which temperature sensors are thermally coupled to primary circuitry on the chip. Signals obtained from the temperature sensors are indicative of power dissipation by the primary circuity on the integrated circuit chip. Comparison with a baseline signal, or golden signature, can be used to determine the presence of a malicious circuit in the primary circuitry.

20 Claims, 8 Drawing Sheets

(56) References Cited

OTHER PUBLICATIONS

S. Bhattacharya, et al., "Use of Embedded Sensors for Built-In-Test of RF Circuits", Proc. IEEE International Test Conference (ITC), Oct. 2004, pp. 801-809.

Y. Cao, et al., "A Cluster-Based Distributed Active Current Sensing Circuit for Hardware Trojan Detection", IEEE Transactions on Information Forensics and Security, Dec. 2014, vol. 9, No. 12, pp. 2220-2231.

"Resilent Military Systems and the Advanced Cyber Threat", Defense Science Board of the U.S. Department of Defense, Jan. 2013, Available online: www.acq.osd.mil/dsb/reports/ResilientMilitarySystems.CyberThreat.pdf.

X. Fan, et al., "A Current Injection Built-In Test Technique for RF Low-Noise Amplifiers", IEEE Transactions on Circuits and Systems-I: Regular Papers, Aug. 2008, vol. 55, No. 7, pp. 1794-1804.

J. Fan, et al., "Low-Energy Encryption for Medical Devices: Security Adds an Extra Design Dimension", Proc. ACM/EDAC/IEEE Design Automation Conf. (DAC), May 2013, Austin, TX, 6 pgs.

J.Feng, et al., "Wide Dynamic Range CMOS Amplifier Design for RF Signal Power Detection via Electra-Thermal Coupling", J. Electron Test, (2014), vol. 30, pp. 101-109.

D. Fujimoto, et al., "Side-Channel Leakage on Silicon Substrate of CMOS Cryptographic Chip", Proc. IEEE International Symposium on Hardware-Oriented Security and Trust (HOST), May 2014, pp. 32-37.

J. L. Gonzalez, et al., "Non-Invasive Monitoring of CMOS Power Amplifiers Operating at RF and mmW Frequencies using an On-chip Thermal Sensor", Proc. IEEE Radio Frequency Integrated Circuits Symposium (RFIC), Jun. 2011, 4 pgs.

K. Hu, et al., "High-Sensitivity Hardware Trojan Detection Using Multimodal Characterization", Proc. Design, Automation & Test in Europe Conference & Exhibition (DATE), Mar. 2013, pp. 1271-1276.

Y. Jin, et al., "Hardware Trojans in Wireless Cryptographic ICs", IEEE Design and Test of Computers, Jan. 2010, vol. 27, No. 1, pp. 26-35.

B. Muldrey, et al., "RAVAGE: Post-Silicon Validation of Mixed Signal Systems Using Genetic Stimulus Evolution and Model Tuning", Proc. IEEE VLSI Test Symposium (VTS), Apr. 2013, 6 pgs.

M. Onabajo, et al, "Electrothermal Design Procedure to Observe RF Circuit Power and Linearity Characteristics With a Homodyne Differential Temperature Sensor", IEEE Transactions on Circuits and Systems-I: Regular Papers, Mar. 2011, vol. 58, No. 3, pp. 458-469.

M. Onabajo, et al., "Survey of Robustness Enhancement Techniques for Wireless Systems-on-a-Chip and Study of Temperature as Observable for Process Variations", J. Electron Test, (2011), vol. 27, pp. 225-240.

R. Rad, et al, "A Sensitivity Analysis of Power Signal Methods for Detecting hardware Trojans Under Real Process and Environmental Conditions", IEEE Transactions on Very Large Scale Integration (VLSI) Systems, Dec. 2010, vol. 18, No. 12, pp. 1735-1744.

M. Rostami, et al, "A Primer on Hardware Security: Models, Methods, and Metrics", Proceedings of the IEEE, Aug. 2014, vol. 102, No. 8, pp. 1283-1295.

S. Shariati, et al., "Energy Monitoring System for Security and Power Management Applications", Proc. Intl. Conf. Microelectronics (ICM), Dec. 2012, 4 pgs.

P. Song, et al., "MARVEL—Malicious Alteration Recognition and Verification by Emission of Light", Proc. IEEE International Symposium on Hardware-Oriented Security and Trust (HOST), Jun. 2011, pp. 117-121.

M. Tehranipoor, et al. "A Survey of Hardware Trojan Taxonomy and Detection", IEEE Design & Test of Computers, Jan. 2010, vol. 27, No. 1, pp. 10-25.

A. Valdes-Garcia, et al., "A Broadband CMOS Amplitude Detector for On-Chip RF Measurements", IEEE Transactions on Instrumentation and Measurement, Jul. 2008, vol. 57, No. 7, pp. 1470-1477.

D. J. Walkey, et al., "Equivalent Circuit Modeling of Static Substrate Thermal Coupling Using VCVS Representation", IEEE Journal of Solid-State Circuits, Sep. 2002, vol. 37, No. 9, pp. 1198-1206.

Q. Wang, et al., "RF Front-end System Gain and Linearity Built-in Test", Proceedings of the 24th IEEE VLSI Test Symposium, May 2006, pp. 228-233.

K. Wang, et al., "Hardware Trojan Detection and Isolation Using Current Integration and Localized Current Analysis", Proc. IEEE International Symposium on Defect and Fault Tolerance of VLSI Systems (DFTVS), Oct. 2008, pp. 87-95.

Q. Yin, et al., "A Translinear RMS Detector for Embedded Test of RF ICs", IEEE Transactions on Instrumentation and Measurement, Oct. 2005, vol. 54, No. 5, pp. 1708-1714.

* cited by examiner

METHOD TO USE ON-CHIP TEMPERATURE SENSORS FOR DETECTION OF TROJAN CIRCUITS

CROSS REFERENCE TO RELATED APPLICATIONS

This application claims priority under 35 § 119(e) of U.S. Provisional Application No. 62/180,780 filed on Jun. 17, 2015, entitled "A Method to Use On-Chip Temperature Sensors for Detection of Trojan Circuits", the disclosure of which is hereby incorporated by reference.

STATEMENT REGARDING FEDERALLY SPONSORED RESEARCH OR DEVELOPMENT

N/A

BACKGROUND

The ongoing trend in the semiconductor industry to disperse the design, fabrication, and testing tasks among companies with different specializations has been driven by various factors related to cost and globalization. Consequently, an increasing number of chips are fabricated in new areas around the world. The trend to fabricate chip designs abroad has, however, led to high security risks, because malicious Trojan hardware can be inserted in less controlled manufacturing environments during the fabrication process of chips. Hardware Trojans can be designed to disclose secret information or access keys, to temporarily disable a system, or to destroy a system. In recent years, they have been identified as a growing problem for chips in, for example, medical applications, wireless cryptography, and military systems. A 2013 task force report from the U.S. Defense Science Board describes concerns related to power, water, and financial infrastructure vulnerabilities caused by hardware Trojans.

Diverse approaches are emerging to detect harmful circuits that can leak information, manipulate information, or deactivate a chip. Many of these techniques involve measurements of power dissipation with external test equipment to identify the presence of maliciously inserted circuits.

Some prior art detection methods are based on the measurement of current or power consumption for the identification of malicious hardware insertions on chips. Some approaches incorporate on-chip sensors to measure the current supplied to clusters of circuits or to measure some other indicator of local electrical power dissipation. A commonality of these approaches is that either a resistor or a transistor is connected within the path between the supply voltage and the circuit in order to sense the current/power. These methods require monitoring of small power dissipations throughout chips, and their effectiveness to detect small Trojan circuits improves as the number of current or power probe locations increases.

SUMMARY OF THE INVENTION

A method to detect the presence of malicious hardware is provided. The method incorporates the placement of small on-chip temperature sensors throughout a chip to sense power dissipation in nearby circuits, thereby revealing activity of any malicious circuits (i.e., Trojan circuits) that were added without the consent of the designer(s) of the chip.

Other aspects of the method and system include the following:

1. A method for detecting a malicious circuit on an integrated circuit chip, comprising:
   providing an integrated circuit chip comprising primary circuitry and one or more temperature sensors formed in layered semiconductor materials, the temperature sensors thermally coupled to the primary circuitry through one or more of the layered semiconductor materials, the temperature sensors in electrical communication with auxiliary circuitry;
   activating the primary circuitry or applying an AC or DC signal to the primary circuitry;
   obtaining a signal from the temperature sensors and the auxiliary circuitry indicative of power dissipation by the primary circuitry on the integrated circuit chip; and
   comparing the obtained signal to a baseline signal to determine a deviation, wherein a deviation is indicative of a presence of a malicious circuit in the primary circuitry.
2. The method of embodiment 1, wherein the deviation of less than 10.0° C. is indicative of a presence of a malicious circuit in the primary circuitry.
3. The method of any of embodiments 1-2, wherein the deviation of less than 1.0° C. is indicative of a presence of a malicious circuit in the primary circuitry.
4. The method of any of embodiments 1-3, wherein the deviation of less than 0.1° C. is indicative of a presence of a malicious circuit in the primary circuitry.
5. The method of any of embodiments 1-4, wherein the deviation of less than 0.01° C. is indicative of a presence of a malicious circuit in the primary circuitry.
6. The method of any of embodiments 1-5, wherein the deviation of 0.001° C. to 10.0° C. is indicative of a presence of a malicious circuit in the primary circuitry.
7. The method of any of embodiments 1-6, wherein the malicious circuit is a circuit not included in a design of the integrated circuit chip when the baseline signal for the integrated circuit chip was obtained.
8. The method of any of embodiments 1-7, wherein obtaining the signal comprises detecting a temperature change at each of the temperature sensors, the temperature change within the one or more layered semiconductor materials generated by power dissipation from a neighboring circuit or device of the primary circuitry.
9. The method of any of embodiments 1-8, wherein obtaining the signal comprises measuring an output current from each temperature sensor, the output current proportional to a temperature within the one or more layered semiconductor materials adjacent the temperature sensor.
10. The method of any of embodiments 1-9, wherein the temperature sensors are electrically isolated from the primary circuitry on the integrated circuit chip.
11. The method of any of embodiments 1-10, wherein the temperature sensors are spaced on the integrated circuit chip in discrete monitor cells, and further comprising obtaining an electrical signal from each of the discrete monitorcells.
12. The method of embodiment 11, further comprising summing electrical output signals from a plurality of temperature sensors in a discrete monitor cell.
13. The method of any of embodiments 1-12, wherein the one or more semiconductor material layers in the layered body includes a layer of silicon, and the temperature sensors are operative to detect temperature changes in the silicon layer representative of power dissipation from the primary circuitry.
14. The method of embodiment 13, wherein the temperature sensors are differential temperature sensors comprising PNP bipolar transistors, and obtaining the signal comprises measuring an output current from each temperature sensor, the output current proportional to a sensitivity of a base-emitter junction of the PNP bipolar transistors to temperature.

15. The method of any of embodiments 1-14, wherein the temperature sensors are operative to detect a power dissipation of less than 100 mW.

14. The method of any of embodiments 1-15, wherein the temperature sensors are operative to detect a power dissipation of less than less than 10 µW.

15. The method of any of embodiments 1-16, wherein the temperature sensors are operative to detect a power dissipation of less than 1 µW.

16. The method of any of embodiments 1-17, wherein the temperature sensors are operative to detect a power dissipation of less than 10 µW for signal and switching frequencies up to 6 GHz.

17. The method of any of embodiments 1-18, wherein the baseline signal is an average power dissipation for the primary circuit.

18. The method of any of embodiments 1-19, further comprising determining the baseline signal during a design validation phase for the integrated circuit chip.

21. The method of any of embodiments 1-20, further comprising, at the auxiliary circuitry, amplifying the signal from each of the temperature sensors, and converting the amplified signal to a digital signal.

22. The method of any of embodiments 1-21, further comprising, at a digital signal processor of the auxiliary circuitry, determining a location on the integrated circuit chip of a temperature sensor detecting power dissipation indicative of the difference from the baseline signal.

23. The method of any of embodiments 1-22, further comprising obtaining a reference signal from a reference temperature sensor on the integrated circuit chip, the reference temperature sensor located on the chip adjacent to the auxiliary circuitry.

24. The method of any of embodiments 1-23, wherein the auxiliary circuitry is disposed partially or completely on the chip.

25. The method of any of embodiments 1-24, wherein the auxiliary circuitry is electrically disconnected from the primary circuitry.

26. The method of any of embodiments 1-25, wherein the primary circuitry includes digital circuits or devices, analog circuits or devices, radio frequency circuits or devices, or mixed-signal circuits or devices, or a combination thereof.

27. The method of any of embodiments 1-26, further comprising comparing the obtained signal of the integrated circuit chip to the baseline signal during production testing of the integrated circuit chip or during a lifetime of the integrated circuit chip.

28. The method of any of embodiments 1-27, wherein the integrated circuit chip comprises a microprocessor, a memory chip, a radio frequency signal processing ship, an application specific integrated circuit (ASIC), or a mixed-signal system-on-a-chip, or a combination thereof.

29. The method of any of embodiments 1-28, wherein the temperature sensors are inserted in the layout of the completed chip design and layout of the primary circuitry, such that the sensors are placed in areas of the chip that would otherwise be unused or filled in with dummy fill structures.

30. A method of designing an integrated circuit chip, comprising:
designing a layout for primary circuitry on the chip;
designing a layout for temperature sensors in areas of the chip that are unused by the primary circuitry; and
designing a layout for auxiliary circuitry in electrical communication with the temperature sensors, the auxiliary circuitry operative to obtain a signal from the temperature sensors indicative of power dissipation by the primary circuity on the integrated circuit chip.

31. An integrated circuit chip comprising:
primary circuitry formed in layered semiconductor materials;
one or more temperature sensors thermally coupled to the primary circuitry through one or more of the layered semiconductor materials, wherein the temperature sensors are located in areas of the chip that would otherwise be unused or filled in with dummy fill structures accordingly to a layout of a completed chip design and layout of the primary circuitry; and
auxiliary circuitry in electrical communication with the temperature sensors and operative to obtain a signal from the temperature sensors indicative of power dissipation by the primary circuity on the integrated circuit chip.

32. The integrated circuit chip of embodiment 31, wherein the auxiliary circuitry is operative to detect a presence of a malicious circuit within the primary circuitry from a temperature measurement from one or more of the temperature sensors.

33. The integrated circuit of any of embodiments 31-32, wherein the primary circuitry includes a malicious circuit not included in a design of the integrated circuit chip when a baseline signal for the integrated circuit chip was obtained.

34. The integrated circuit chip of any of embodiments 31-33, wherein the temperature sensors are electrically isolated from the principal circuits.

35. The integrated circuit chip of any of embodiments 31-34, wherein the auxiliary circuitry is electrically isolated from the principal circuitry.

36. The integrated circuit chip of any of embodiments 31-35, wherein the temperature sensors are spaced within the layered chip area to form discrete monitor cells.

37. The integrated circuit chip of any of embodiments 31-36, wherein the temperature sensors are distributed throughout the layered chip area in regions empty of the primary circuitry.

38. The integrated circuit chip of any of embodiments 31-37, wherein the one or more semiconductor material layers in the layered body includes a layer of silicon, and the temperature sensors are operative to detect temperature changes in the silicon layer representative of power dissipation from the circuitry.

39. The integrated circuit chip of any of embodiments 31-38, wherein the auxiliary circuitry is operative to compare the obtained signal to a baseline signal to determine a deviation, wherein a deviation is indicative of a presence of a malicious circuit in the primary circuitry.

40. The integrated circuit chip of any of embodiments 31-39, wherein the temperature sensors comprise bipolar transistors.

41. The integrated circuit chip of any of embodiments 31-40, wherein the temperature sensors comprise PNP transistors.

42. The integrated circuit chip of any of embodiments 31-41, wherein the temperature sensors are vertical transistors.

43. The integrated circuit chip of any of embodiments 31-42, wherein the primary circuitry is fabricated with complementary metal-oxide semiconductor (CMOS) process technology or with a manufacturing process technology for metal-oxide semiconductor field-effect transistors.

44. The integrated circuit chip of any of embodiments 31-43, wherein the primary circuitry includes digital logic circuits, analog circuits, radio frequency circuits, mixed-signal circuits, or a combination thereof.

45. The integrated circuit chip of any of embodiments 31-44, wherein the integrated circuit chip comprises a microprocessor, a memory chip, an analog chip, a radio frequency signal processing chip, an application specific integrated circuit (ASIC), or a mixed-signal system-on-a-chip, or a combination thereof.

DESCRIPTION OF THE DRAWINGS

The invention will be more fully understood from the following detailed description taken in conjunction with the accompanying drawings in which.

DETAILED DESCRIPTION OF THE INVENTION

This application incorporates by reference the entire disclosure of U.S. Provisional Application No. 62/180,780 filed on Jun. 17, 2015, entitled "A Method to Use On-Chip Temperature Sensors for Detection of Trojan Circuits."

A technique is provided that addresses the need for efficient on-chip sensors that can monitor small variations of power dissipation in the primary circuitry on the chip. The technique avoids external measurement equipment through an on-chip detection system. Small on-chip temperature sensors throughout the chip are used to sense power dissipation in nearby circuits, thereby revealing activity of any circuits that were added without the consent of the designers. Standard auxiliary on-chip circuits can process the sensor output signals and convert the information into the digital domain for further analysis.

Figure 1:
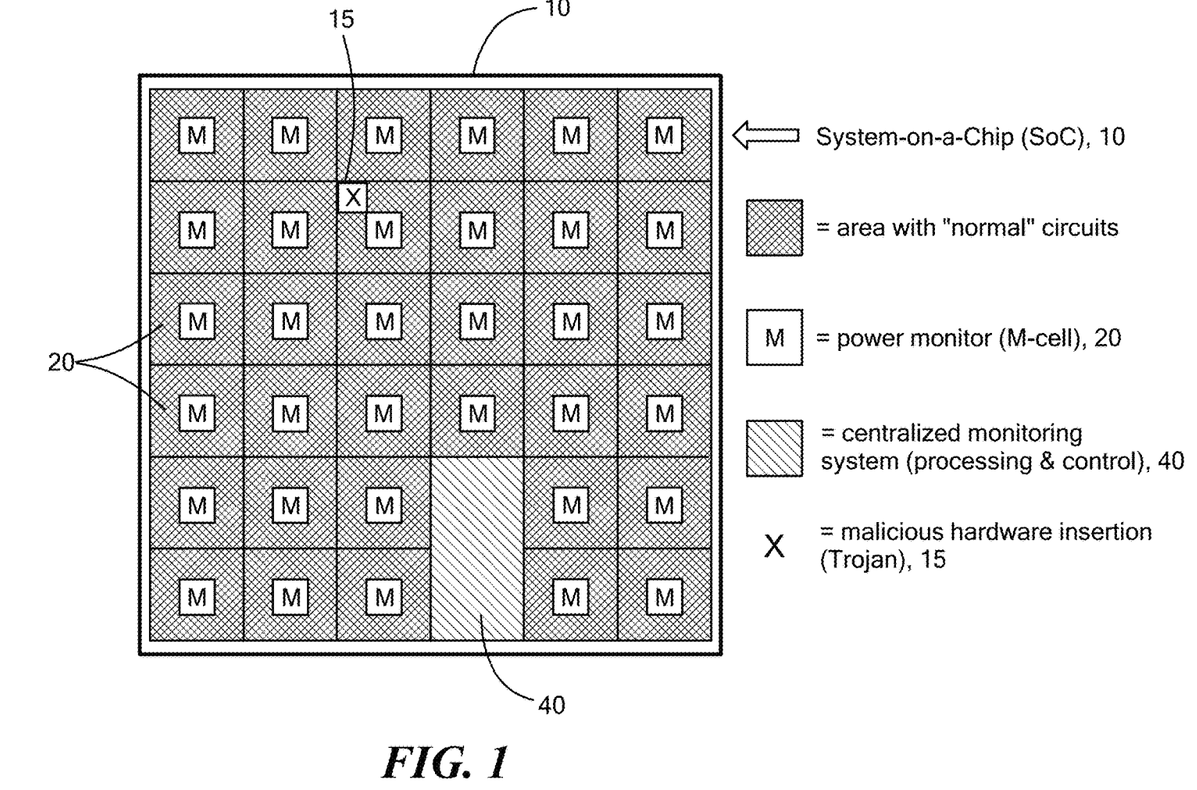
FIG. 1 is a schematic illustration of an embodiment of a partitioned die with an on-chip malicious hardware detection system.

FIG. 1 schematically illustrates an embodiment of a chip utilizing an on-chip Trojan hardware detection system to identify the presence of malicious circuits in the primary circuitry by sensing their power dissipation. FIG. 1 shows a malicious circuit element 15, denoted by an X, that has been inserted into the chip, contrary to the intentions of the chip's designers. The chip as designed also includes one or more temperature sensors 22 (see FIG. 2). When the malicious circuit element is activated, its power dissipation can be sensed as a temperature rise in the semiconductor material layer(s) by a temperature sensor 22 in the vicinity of the malicious circuit element. In the embodiment illustrated, a plurality of monitor cells ("M-cells") 20 are distributed across the chip 10, each containing one or more compact temperature sensors 22. The temperature sensors are in electrical communication with auxiliary circuitry that can receive a signal from the temperature sensors indicative of power dissipation by the primary circuitry. The signal obtained from the temperature sensor(s) can be compared to a baseline signal to determine if a deviation exists, where the deviation is indicative of the presence of the malicious or Trojan circuitry.

In some embodiments, the auxiliary circuitry can include a control unit 40 that contains post-amplification circuitry for the temperature-sensing devices, saving die area by serially routing the outputs from the monitors to a central core. This centralized core or block can include an analog-to-digital converter (ADC) 42 (see FIG. 2) to capture the signals from the variation-sensing sites as well as control circuits for the on-chip measurements. Digital processing circuitry 44 can be provided such that digital test data can be transferred to external low-cost automatic test equipment through a few serial buses. The power monitors can be realized with small temperature sensors within the M-cells to measure thermal gradients across chips. In practice, one or several chips free of malicious hardware can be selected after comprehensive testing during the design validation and characterization test phase. The thermal profile that results from the average power dissipation of the circuits on the verified chips will serve as a baseline or "golden signature." Such a golden signature can be used as a reference during faster testing of chips to detect potentially harmful circuit insertions in the high volume production phase or for recurring detection routines throughout the lifetime of a chip. In some embodiments, a deviation from the baseline of 0.001° C. to 10.0° C. can be indicative of the presence of a malicious circuit in the primary circuitry. In some embodiments, a deviation from the baseline of less than 10.0° C., less than 1.0° C., less than 0.1° C., or less than 0.01° C. can be indicative of the presence of a malicious circuit in the primary circuitry.

The technique can provide non-intrusive local power detection. More particularly, the technique can detect harmful circuits through their power dissipation based on sensing the temperature change of the nearby silicon area on the chip. In some embodiments, the sensing devices are smaller than 15 µm×15 µm such that they can be placed into small unoccupied areas of a completed chip layout. In some embodiments, each temperature-sensing device can have a sensitivity that is sufficiently high to detect a circuit consuming as little as 1 µW. In some embodiments, the temperature sensors are operative to detect a power dissipation of less than 100 mW. In some embodiments, the temperature sensors are operative to detect a power dissipation of less than 10 µW. In some embodiments, the temperature sensors are operative to detect a power dissipation of less than 1 µW.

In contrast to prior art built-in testing approaches with on-chip electrical power/peak detectors, the thermal measurement does not affect the analog circuits under test. To enable the detection of Trojan circuits, the temperature-sensing circuits for on-chip power detection can be arranged such that the outputs of multiple sensors can be merged to form one regional monitor (M-cell). The non-intrusive nature of the thermal detection method allows the sensors to be placed to monitor digital circuits with relatively low operating speeds as well as sensitive high-speed digital circuits and analog and radio frequency circuits in mixed-signal systems-on-a-chip.

The on-chip Trojan detection technique can provide for the detection of malicious hardware with on-chip measurement and processing resources without electrically connecting to the primary circuits on the chip and can therefore avoid performance degradation of the primary circuits.

Towards this goal, an efficient analog-to-digital converter (ADC) and digital detection control circuitry can be integrated with the analog sensor output conditioning circuits. The approach permits the use of energy-efficient auxiliary circuits for processing of the sensor outputs because the electro-thermal coupling mechanism converts the high-frequency information into the low-frequency or direct current (DC) domains.

Figure 2:
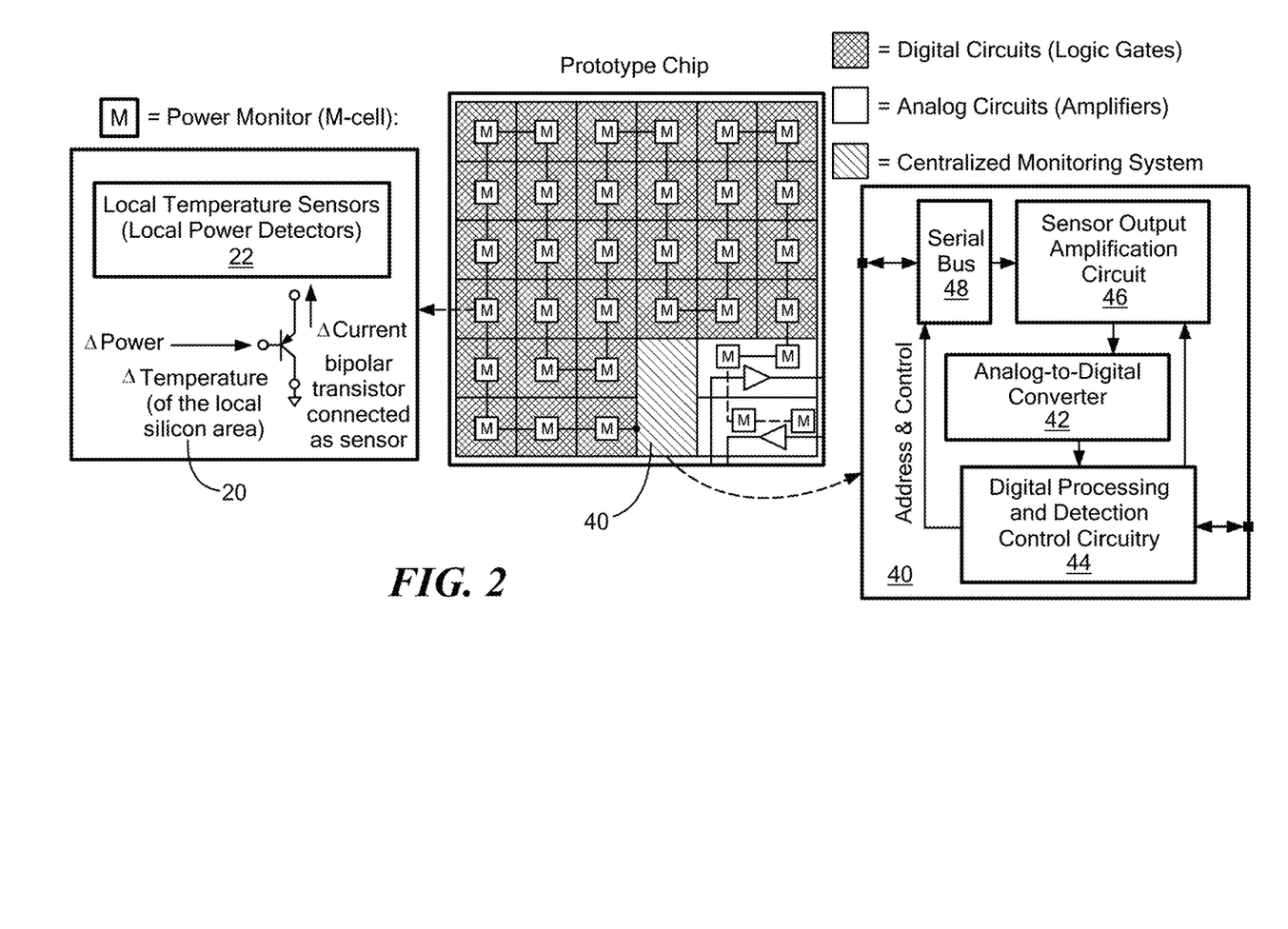
FIG. 2 is a schematic illustration of a chip with an embodiment of an on-chip malicious hardware detection system.

FIG. 2 depicts an embodiment of the Trojan detection system components and circuits included on a chip that contains digital circuits 44 and also analog amplifiers 46. Since the temperature sensors measure average power dissipation in the nearby silicon areas, the technique is agnostic to the types of circuit configurations that the transistors are arranged in, thereby making it well-suited for malicious hardware detection on mixed-signal chips. The temperature-sensing devices are distributed throughout the empty areas of the chip as part of the insertion of dummy fill structures, which is standard practice in order to meet the density requirements for each layer prior to the layout submission for fabrication. In the envisioned system, the DC output currents from all sensors within a monitoring cell (M-cell) can be summed up to sense the power dissipation in a local area via temperature changes. The outputs of all M-cells on the chip can be selectively passed to the shared processing circuitry in the core of the system through the use of a serial bus 48 with N lines (to address $2^N$ sites) and up to eight extra lines for the differential output signal, calibration currents, and control signals. The temperature sensors 22 are arranged in a configuration such that they can measure the average power dissipation of circuits in their vicinity. Analogous to the current integration over time, this approach entails monitoring of average power over time, which can be implemented with a plurality of M-cells. In some embodiments, 40 or more M-cells can be provided, although it will be appreciated that the number of M-cells and the number of temperature sensors can vary depending on the particular chip or application. In some embodiments, the temperature sensors 22 can be placed into all empty areas of the chip and the output currents of multiple small sensors can be summed up to form M-cells. The magnitude of the silicon temperature change caused by the power dissipation from a device decreases exponentially with distance, revealing that distances below 50 μm between the sensor and the circuit under test are best suited for built-in testing applications. Hence, in some embodiments, all empty areas of finalized chip layouts can be filled with small vertical bipolar (PNP) transistors (<15 μm×15 μm) that are available in standard complementary metal-oxide-semiconductor (CMOS) technologies, making it possible to restrict unoccupied areas (into which transistors of Trojan circuits can be placed) to below 20 μm×20 μm. Therefore, the power dissipation of any inserted devices can be picked up by nearby temperature sensors with high sensitivity, described further below. Consequently, the combined output signature measured by the on-chip system is different from that of the golden signature in case a Trojan has been inserted. If an aggressor removes one or multiple PNP sensor devices from the network, then the output signature would also deviate from the golden signature because the sensitivity of the temperature-based power detection changes in the M-cell in which the sensing-device has been removed. In some embodiments, a dedicated on-chip analog-to-digital converter (ADC) 42 with a projected resolution of 9-bits can quantize the amplified DC output currents of the M-cells after converting them to voltages, making the data available in digital format for further processing. In some embodiments, an ADC sampling with a 32 MS/s rate can permit fast capturing of the outputs from the sensing sites while maintaining adequate power consumption when the ADC is operating during the detection mode. Since higher sampling rates reduce test times in practical applications, achieving the relatively low power ADC consumption for the sampling rate can be beneficial when the system is utilized for periodic in-field tests to determine if a dormant Trojan circuit has been activated on a chip.

The described technique can monitor power dissipation without any electrical connections to the signal path of the primary circuit of the chip. Thus, the technique can overcome a drawback of prior art approaches in which a resistor or transistor is connected in the path between the supply voltage and the primary circuit to sense the current/power, which can lead to voltage fluctuations for high-speed digital circuits or high-frequency analog circuits, thereby degrading performance. For this reason, the characteristics of on-chip differential temperature sensors make them suitable as non-invasive power detectors without direct electrical connections to the signal path or power supply path.

Figure 3:
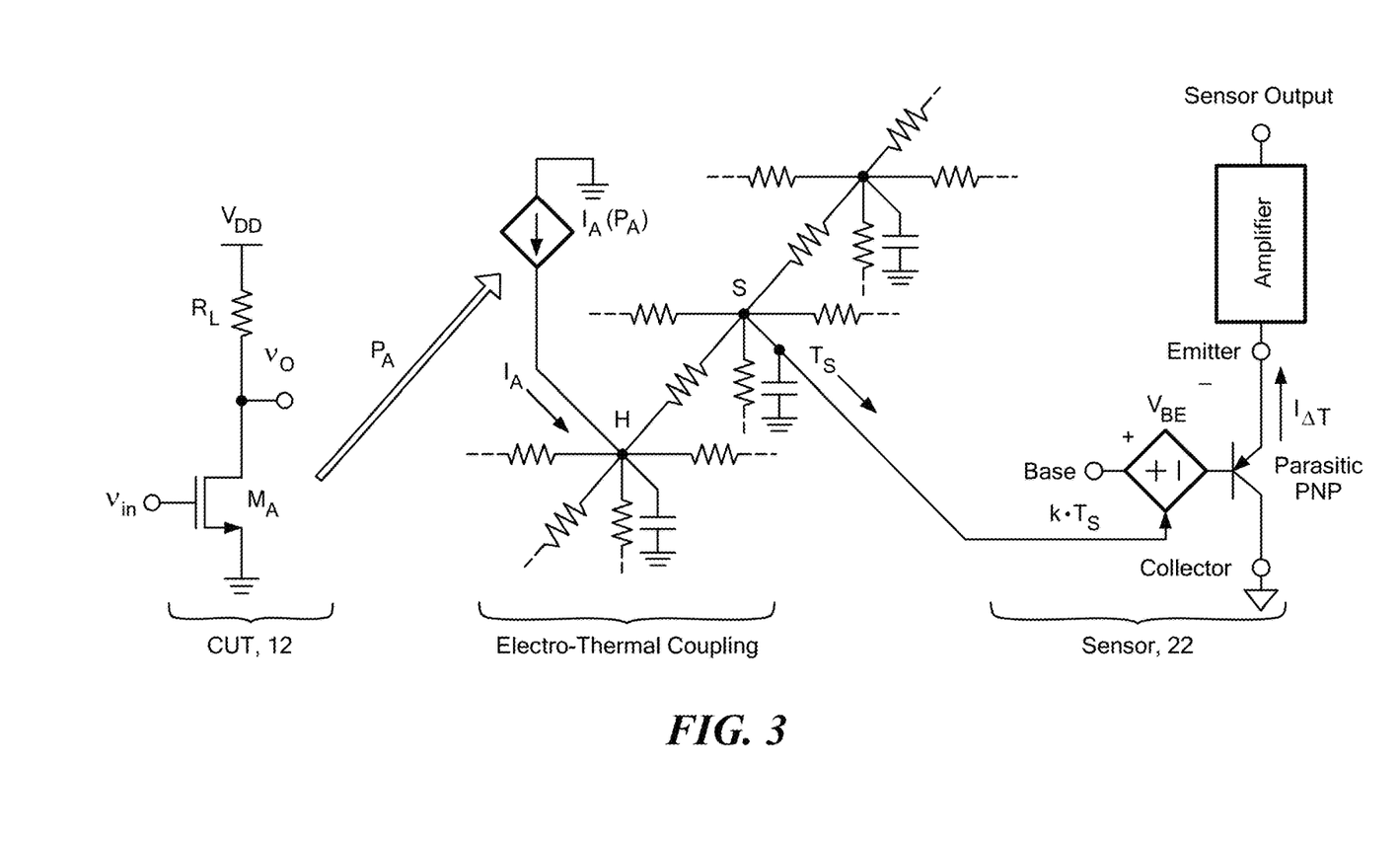
FIG. 3 is a schematic illustration of a simplified model of electro-thermal coupling.
Figure 4:
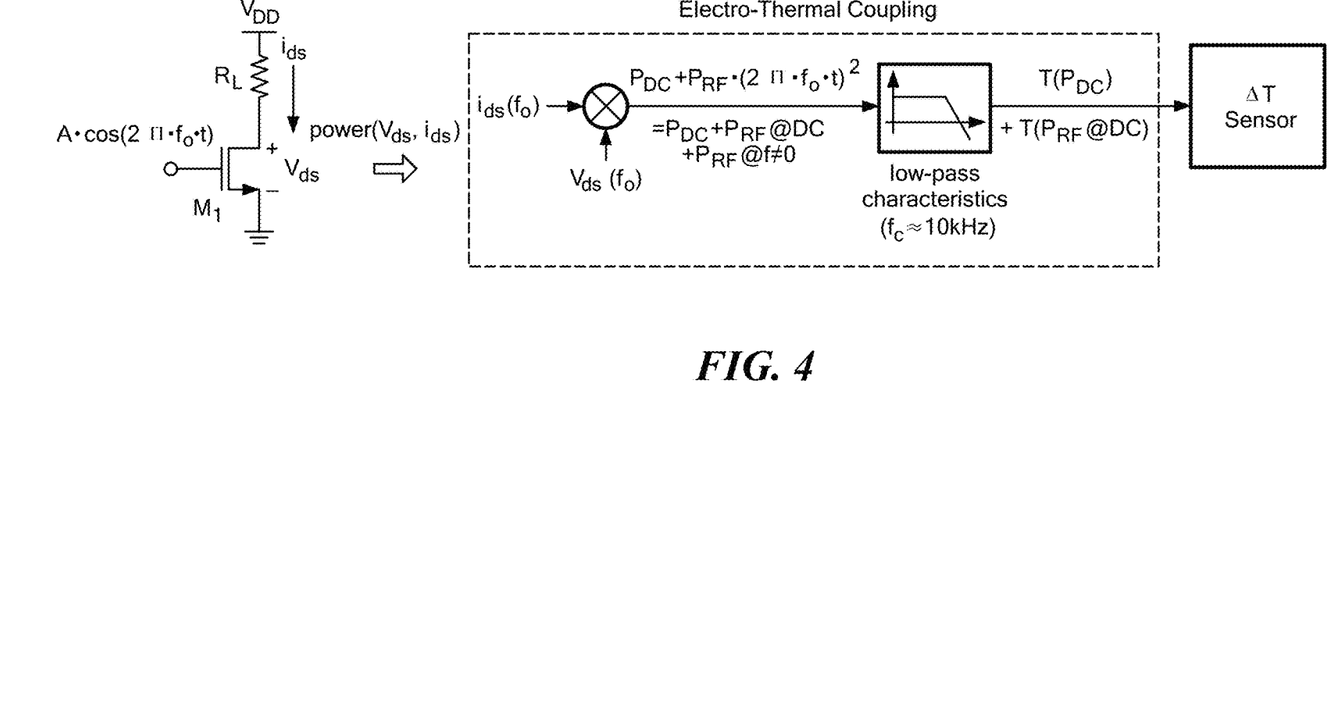
FIG. 4 is a schematic illustration of a conceptual equivalent representation of electro-thermal coupling between a circuit and a sensing device.

Thermal or electro-thermal coupling through the semiconductor substrate generates a temperature change in the vicinity of a circuit or device that depends on its power dissipation. The electro-thermal interactions between devices can be modeled with a resistor-capacitor (RC) grid and controlled sources. As shown for an example amplifier circuit under test (CUT) 12 in FIG. 3, the temperature sensors 22 within the M-cells can detect power from direct current (DC) and alternating current (AC) conditions based on sensed temperature changes when the circuits are activated or the AC or DC signal is applied. Each node in the RC network represents a unit volume of the silicon die, at which the injected current $I_A$ models the power dissipation of transistor $M_A$ at location H. Each voltage node in the grid models a temperature change ($\Delta T$) with respect to the ambient die temperature based on the heat flow model. In FIG. 3, a vertical bipolar device (PNP) is used as a temperature transducer at location S. Since the amount of coupling between locations H and S reduces rapidly with distance, the sensor should be placed close to the CUT to ensure that the locally measured temperature change $T_S$ predominantly reflects the power dissipation of nearby transistor $M_A$. The factor k ($\approx$ −2 mV/° C.) in FIG. 3 is the sensitivity of the base-emitter junction to temperature, which causes the output current of the bipolar transistor (in the M-cell 20) to change, allowing the DC output voltage of the following amplifier (in the system core 40) to be used as a monitor. In some embodiments, a differential sensing and amplification approach with another PNP at a reference point can be used to achieve high sensitivity and to ease the sensor calibration (not shown in the simplified model in FIG. 3). Besides avoiding electrical contact with the CUT, the relevant output currents of the PNP devices are at low frequencies. As visualized in FIG. 4, the electro-thermal coupling can involve down-conversion of the high-frequency signal power content to DC (or low frequencies) as well as inherent low-pass filtering.

Figure 5:
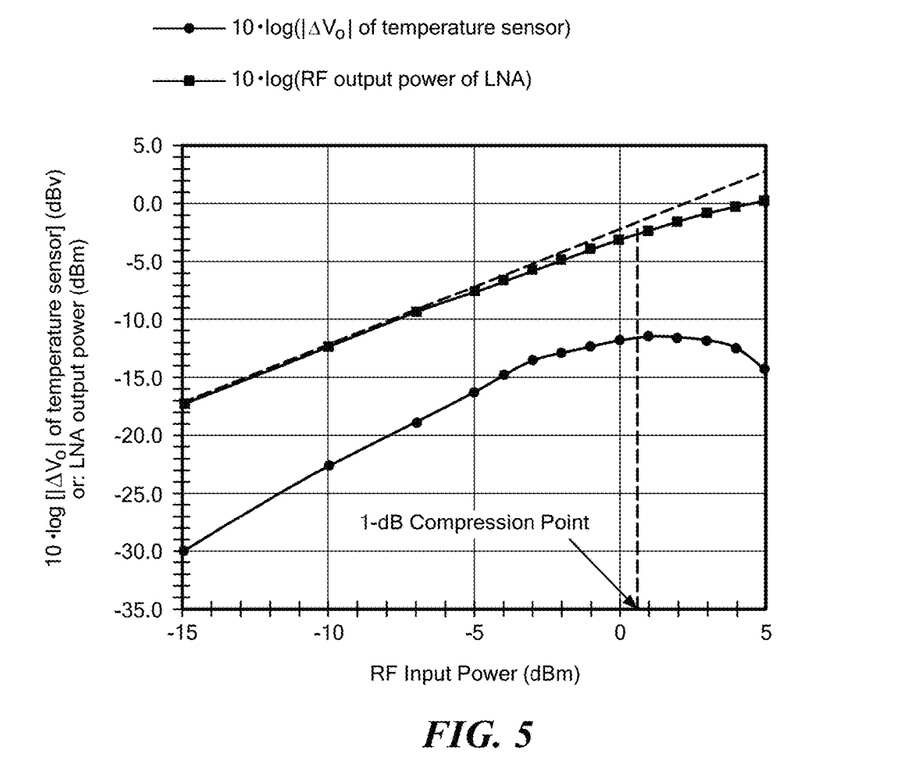
FIG. 5 is a graph of power detection capability of a temperature sensor illustrating a 1-dB compression point measurement.

For compatibility with standard CMOS process technologies, in some embodiments, vertical bipolar (PNP) transistors can be utilized as temperature-sensing devices, each occupying less than 15 μm×15 μm chip area. In some embodiments, a suitable sensor can measure power levels as low as 1 μW for signal and switching frequencies up to 6 GHz. As an example, FIG. 5 shows the measured output power of a radio frequency (RF) low-noise amplifier (LNA) at 1 GHz vs. the applied input power, from which the 1-dB compression point is identified as a standard linearity characteristic. From the figure, this point corresponds to the peak DC output voltage (log-magnitude) of the temperature sensor with an estimation error within 1 dB.

Figure 6:
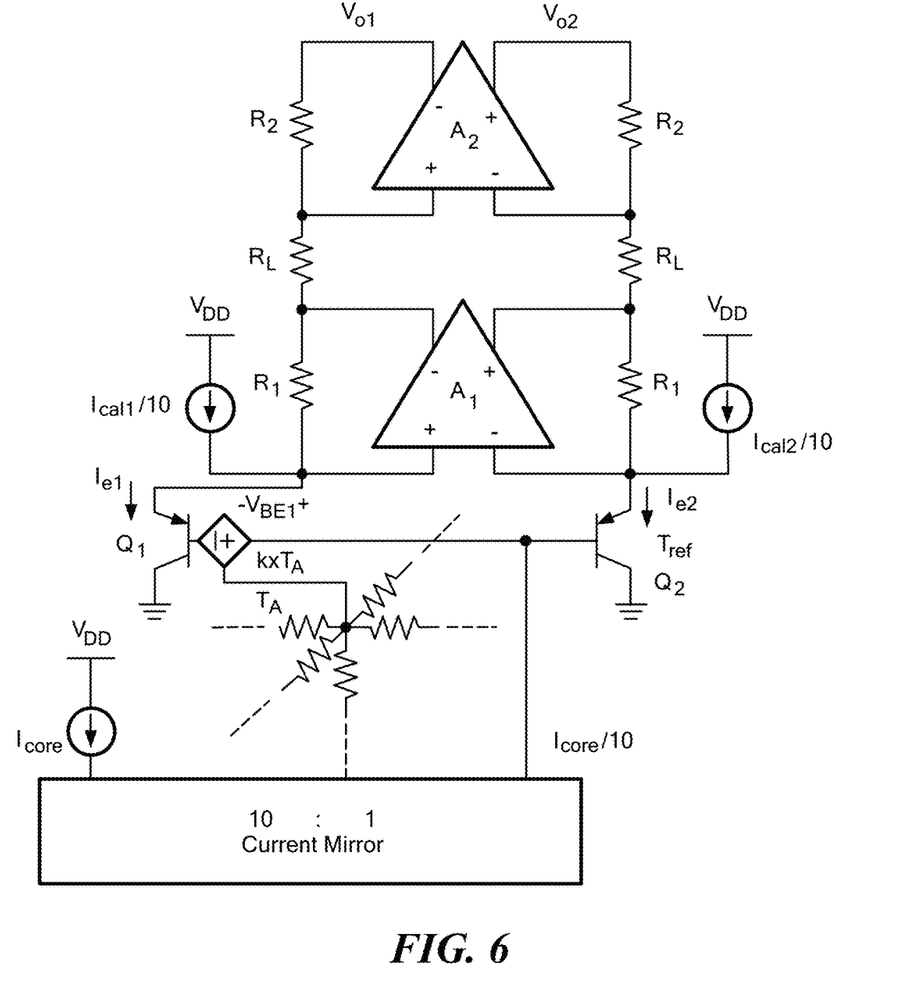
FIG. 6 is a schematic illustration of a further embodiment of a differential temperature sensor architecture.
Figure 7:
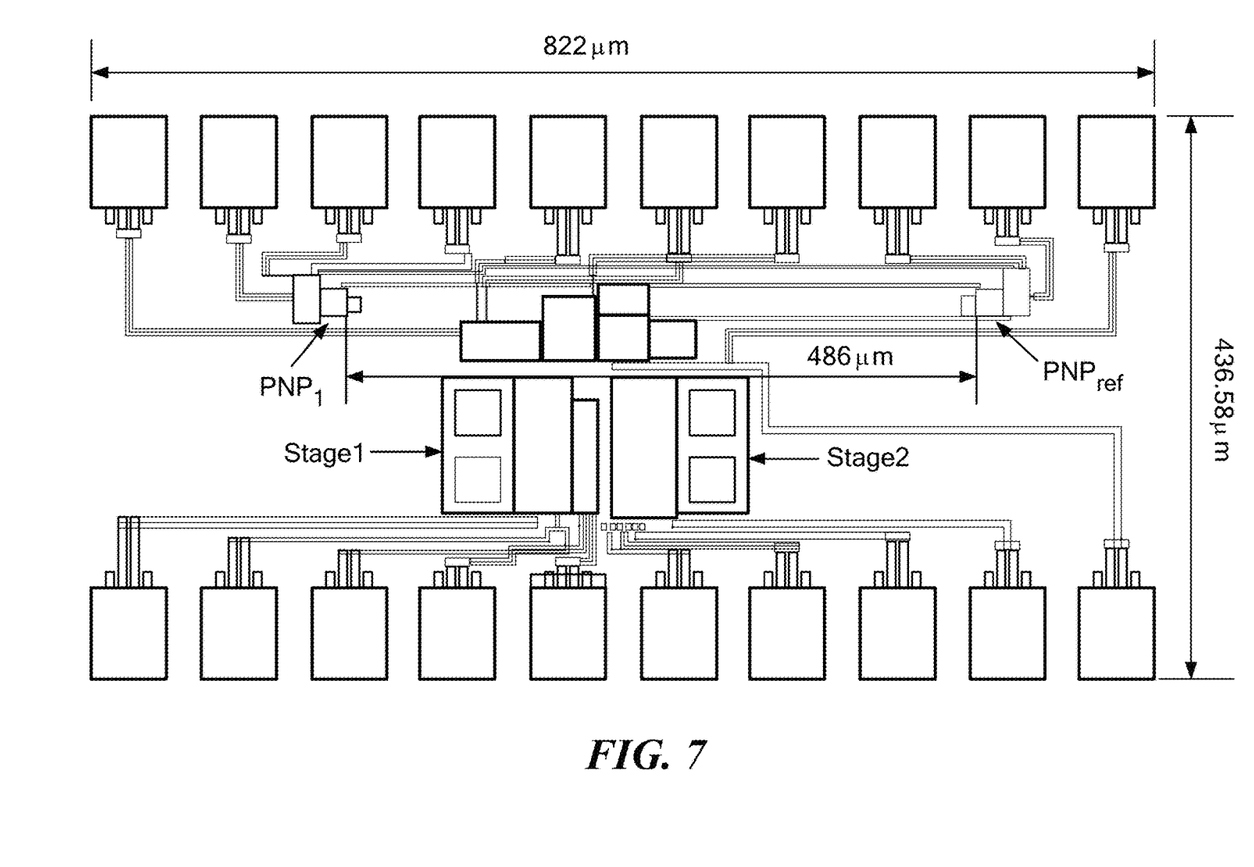
FIG. 7 is an illustration of an embodiment of a layout of an on-chip differential temperature sensor.

The sensor in FIG. 3 can be implemented with any temperature sensor design. In some embodiments, feasible temperature sensors can be differential types for on-chip thermal testing and variation monitoring. As an example, FIG. 6 illustrates an embodiment of a sensor architecture, with amplification stages $A_1$ and $A_2$, both of which can be present on the same chip. The node $T_A$ is where the temperature change couples to the bipolar device (PNP) when a nearby device dissipates power. This electro-thermal coupling can be modeled with a voltage-controlled voltage source that modulates the base-emitter voltage ($V_{be}$) with an approximate gain of k≈−2 mV/K, such that $\Delta V_{be} = k \times \Delta T$. The resulting change of the emitter current is $\Delta I_e = I_{e1} - I_{e2} = \Delta V_{be} \times g_{mQ}$, where $g_{mQ}$ is the transconductance of the PNP device. Hence, the sensitivity of the differential current can be defined as $S_T = \Delta I_e / \Delta T = k \times g_{mQ}$. Correspondingly, the sensitivity of the differential output voltage ($\Delta V_o = V_{o2} - V_{o1}$) is $S_V = \Delta V_o / \Delta T = S_T \times (R_1 / R_L) \times R_2$. The calibration current sources $I_{cal1}$ and $I_{cal2}$ in FIG. 6 allow compensation for mismatches from process variations in the sensor circuitry as well as for thermal gradients from other power-dissipating devices on the chip. FIG. 7 shows an embodiment of a possible chip layout of the sensor in FIG. 6; in which $PNP_1$ corresponds to $Q_1$, $PNP_{ref}$ corresponds to $Q_2$, stage 1 is comprised of amplifier $A_1$ with auxiliary components, and stage 2 consists of amplifier $A_2$ with auxiliary components. The technique for detection of Trojan circuits entails that device $Q_1$ ($PNP_1$) is placed within an M-cell, while device $Q_2$ ($PNP_{ref}$) is located in the same area on the chip as stage 1 and stage 2 that together form the sensor output amplification circuit.

Figure 8:
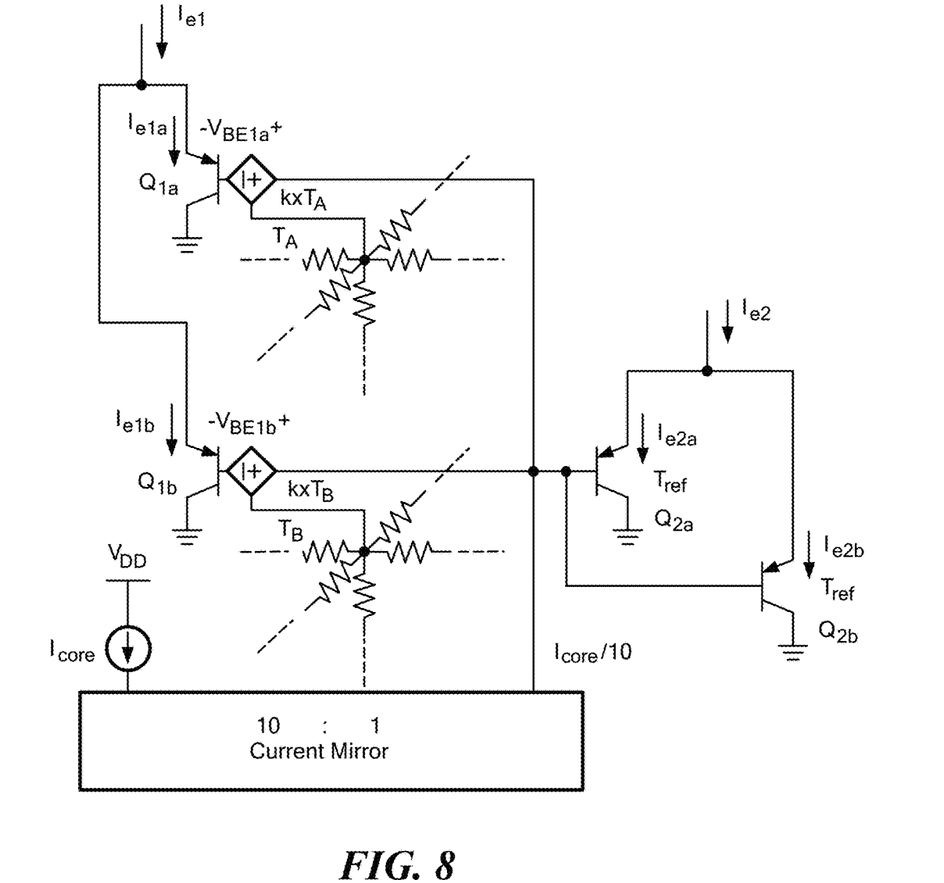
FIG. 8 is an embodiment of a monitoring cell (M-cell) with multiple temperature sensing devices.

With a sensor such as the one in FIG. 6, the temperature sensing devices reside in each M-cell as depicted in FIG. 2. Within an M-cell, the output currents of multiple PNP devices can be summed up to sense the power dissipation of nearby Trojan circuits, which increases the sensitivity of detection and/or allows an M-cell to cover a larger silicon area, illustrated schematically in FIG. 8 using, as an example, two sensing devices per M-cell, where $T_A$ and $T_B$ denote silicon substrate temperatures at different locations within an M-cell.

A calibration can be performed to ensure reliable power detection through temperature measurements in the presence of process variations and thermal gradients that result from power dissipations in circuits on the chip that are powered up even if the test signal is not applied. In the absence of electrical mismatches and thermal interference, differential temperature sensors have a differential output equal to zero. A single-point calibration step can be used prior to each measurement to compensate for electrical offsets and thermal gradients by injecting an appropriate current to balance the output. The calibration can be performed prior to applying a test pattern for digital circuits (or an AC test signal for analog circuits). If certain circuits on the chip cannot be powered down, then the calibration can compensate for the on-chip temperature gradient created by the average power dissipation of those circuits. Afterwards, the application of input test patterns to some or all of the circuits on the chip can result in local differential temperature changes that reflect the average of the dynamic power dissipation. Thus, the golden signature can be obtained using a few samples that are known to be free of Trojan circuits. While the creation of a golden model uses identification of Trojan-free chips and comprehensive testing in the ramp-up phase of products, the known-good samples in the characterization test phase can be used. Use of golden signatures for Trojan detection can permit avoiding or lowering the complexity of process variation models, statistical analysis methods, and measurement accuracy requirements. The temperature sensor calibration process can be automated with a comparator and digital control circuitry in the core of the detection system. Hence, the measurements can be immune to interference from on-chip or ambient heat sources as long as no new circuits are activated during the duration (<25 μs) of a temperature measurement.

The technique to detect adverse circuits with on-chip temperature sensors described herein can provide a number of advantages. Local power dissipations from numerous locations on the chip can be monitored without requiring a large number of additional pins or exposing the surface of the chip. Compared to other on-chip power monitoring circuits, the temperature sensors are not electrically connected to the supply voltage path or any internal nodes of the functional circuits. Therefore, the technique avoids the performance degradation problems associated with monitoring sensitive high-speed digital circuits and high-frequency analog circuits. A single control unit can contain the post-amplification circuitry for the temperature-sensing devices, saving chip area by allowing serial routing of the outputs from the temperature sensors to a central core. The DC output voltages of the temperature sensors can be converted with standard analog-to-digital converters on the chip, allowing detection of the power dissipation of Trojan circuits with standard on-chip digital control circuits. The on-chip detection system can circumvent the need for and cost of external measurement equipment, which can also enable periodic checking throughout the lifetime of a chip. The temperature sensors can be placed into unused areas of a chip at the end of the design cycle, minimizing the area overhead and impact on the design flow.

In some embodiments, the technique can be used with primary circuitry fabricated with complementary metal-oxide semiconductor (CMOS) process technology or with another manufacturing process technology for metal-oxide semiconductor field-effect transistors. In some embodiment, the primary circuitry can include digital logic circuits, analog circuits, radio frequency circuits, mixed-signal circuits, or combinations thereof. The technique can be used with a variety of chips, such as microprocessors, memory chips, RF signal processing chips, application specific integrated circuits (ASICs), mixed-signal processing chips, and combinations thereof.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A method for detecting a malicious circuit on an integrated circuit chip, comprising:
    providing an integrated circuit chip comprising primary circuitry and one or more temperature sensors formed in layered semiconductor materials, the temperature sensors thermally coupled to the primary circuitry through one or more of the layered semiconductor materials, the temperature sensors in electrical communication with auxiliary circuitry, wherein the auxiliary circuitry is electrically disconnected from the primary circuitry;
    activating the primary circuitry or applying an AC or DC signal to the primary circuitry; obtaining a signal from the temperature sensors and the auxiliary circuitry indicative of power dissipation by the primary circuity on the integrated circuit chip; and
    comparing the obtained signal to a baseline signal to determine a deviation, wherein a deviation is indicative of a presence of a malicious circuit in the primary circuitry;
    wherein obtaining the signal comprises detecting a temperature change at each of the temperature sensors, the temperature change within the one or more layered semiconductor materials generated by power dissipation from a neighboring circuit or device of the primary circuitry; and
    wherein the baseline signal is an average power dissipation for the primary circuit.

2. The method of claim 1, wherein the deviation of 0.001° C. to 10.0° C. is indicative of a presence of a malicious circuit in the primary circuitry.

3. The method of claim 1, wherein the malicious circuit is a circuit not included in a design of the integrated circuit chip when the baseline signal for the integrated circuit chip was obtained.

4. The method of claim 1, wherein obtaining the signal comprises measuring an output current from each temperature sensor, the output current proportional to a temperature within the one or more layered semiconductor materials adjacent the temperature sensor.

5. The method of claim 1, wherein the temperature sensors are electrically isolated from the primary circuitry on the integrated circuit chip.

6. The method of claim 1, wherein the temperature sensors are spaced on the integrated circuit chip and connected to each other within discrete monitor cells, and further comprising obtaining an electrical signal from each of the discrete monitor cells.

7. The method of claim 6, further comprising summing electrical output signals from a plurality of temperature sensors in a discrete monitor cell.

8. The method of claim 1, wherein the one or more semiconductor material layers in the layered body includes a layer of silicon, and the temperature sensors are operative to detect temperature changes in the silicon layer representative of power dissipation from the primary circuitry.

9. The method of claim 8, wherein the temperature sensors comprise PNP bipolar transistors, and obtaining the signal comprises measuring an output current from each temperature sensor, the output current proportional to a sensitivity of a base-emitter junction of the PNP bipolar transistors to temperature.

10. The method of claim 1, wherein the temperature sensors are operative to detect a power dissipation of less than 10 µW for signal and switching frequencies up to 6 GHz.

11. The method of claim 1, further comprising determining the baseline signal during a design validation phase for the integrated circuit chip.

12. The method of claim 1, further comprising, in the auxiliary circuitry, amplifying the signal from each of the temperature sensors, and converting the amplified signal to a digital signal.

13. The method of claim 1, further comprising, in a digital signal processor of the auxiliary circuitry, determining a location on the integrated circuit chip of a temperature sensor detecting power dissipation indicative of the difference from the baseline signal.

14. The method of claim 1, further comprising obtaining a reference signal from a reference temperature sensor on the integrated circuit chip, the reference temperature sensor located on the chip adjacent to the auxiliary circuitry.

15. The method of claim 1, wherein the auxiliary circuitry is disposed partially or completely on the chip.

16. The method of claim 1, wherein the primary circuitry includes digital logic circuits or devices, analog circuits or devices, or radio frequency circuits or devices, mixed-signal circuits or devices, or a combination thereof.

17. The method of claim 1, further comprising comparing the obtained signal of the integrated circuit chip to the baseline signal during production testing of the integrated circuit chip or during a lifetime of the integrated circuit chip.

18. The method of claim 1, wherein the integrated circuit chip comprises a microprocessor, a memory chip, an analog chip, a radio frequency signal processing chip, an application specific integrated circuit (ASIC), or a mixed-signal system-on-a-chip, or a combination thereof.

19. A method for detecting a malicious circuit on an integrated circuit chip, comprising:
    providing an integrated circuit chip comprising primary circuitry and one or more temperature sensors formed in layered semiconductor materials, the temperature sensors thermally coupled to the primary circuitry through one or more of the layered semiconductor materials, the temperature sensors in electrical communication with auxiliary circuitry, wherein the auxiliary circuitry is electrically disconnected from the primary circuitry;
    activating the primary circuitry or applying an AC or DC signal to the primary circuitry;
    obtaining a signal from the temperature sensors and the auxiliary circuitry indicative of power dissipation by the primary circuity on the integrated circuit chip; and
    comparing the obtained signal to a baseline signal to determine a deviation, wherein a deviation is indicative of a presence of a malicious circuit in the primary circuitry;
    wherein the one or more semiconductor material layers in the layered body includes a layer of silicon, and the temperature sensors are operative to detect temperature changes in the silicon layer representative of power dissipation from the primary circuitry; and wherein the temperature sensors comprise PNP bipolar transistors, and obtaining the signal comprises measuring an output current from each temperature sensor, the output current proportional to a sensitivity of a base-emitter junction of the PNP bipolar transistors to temperature.

20. The method of claim 19, wherein the temperature sensors are spaced on the integrated circuit chip and connected to each other within discrete monitor cells, and further comprising obtaining an electrical signal from each of the discrete monitor cells.

\* \* \* \* \*